Patented Feb. 27, 1940

2,191,897

UNITED STATES PATENT OFFICE 2,191,897

PLASTICIZING CELLULOSIC ARTICLES

Frederick Madison Meigs, Wilmington, Del., assignor to E. I. du Pont de Nemours & Company, Wilmington, Del., a corporation of Delaware No Drawing. Application May 9, 1939,
Serial No. 272,645

5 Claims. (Cl. 91—68)

This invention relates to cellulosic structures, especially those of pellicular nature. More particularly, it relates to a method for producing flexible and durable cellulosic pellicles by treating the same with softening agents, and the products resulting from such treatment.

In the manufacture of cellulosic pellicles of the type precipitated from aqueous alkaline cellulosic solutions, such as regenerated cellulose pellicles, including sheets or films, caps, bands, continuous tubing, artificial straw and the like, it has long been customary to incorporate into the cellulosic pellicle a softening agent in order to maintain it in a flexible condition. Such cellulosic pellicles, when free from a softening agent, are known to be quite brittle, and while a softener-free pellicle may find certain uses, a softened and therefore flexible sheet or film is much more generally useful. Heretofore, as softeners for regenerated cellulose, and similar water-sensitive cellulosic pellicles, the art has applied such substances as ethylene glycol, propylene glycol, diethylene glycol, formamide, glycerol, and the like, but of these, by far the most important is glycerol which has hitherto known no equal as a softening agent of general utility for producing flexible, transparent, and durable water-sensitive cellulosic pellicles such as those of regenerated cellulose. Many attempts have been made to find a softener for water-sensitive cellulosic pellicles which will be as cheap as and which will have the generally useful softening characteristics of glycerol. After continued use of previously discovered softening agents they were found to be deficient in some respect and therefore could not be generally substituted for glycerol as a softening agent for regenerated cellulose and like water-sensitive cellulosic pellicles.

Glycerol is obtained commercially primarily as a by-product from the soap industry. As a by-product, the quantity may be limited and hence glycerol is subject to market fluctuations of supply as well as price. Glycerol has been particularly high-priced and difficultly obtainable during periods of war when large quantities are used in the production of munitions. The glycols, mentioned above as useful cellulose softeners, are for the most part obtained by a relatively expensive process of synthesis. The glycols are also relatively volatile and are therefore unsatisfactory for use in softening some types of cellulosic pellicles. For an industry consuming large amounts of these materials, therefore, the development of less expensive equivalents or means for reducing the consumption of expensive materials will mean a marked economy in production.

It is, therefore, an object of this invention to provide a new and useful method for producing softened water-sensitive cellulosic materials possessing desirable physical properties.

It is a further object of this invention to provide water-sensitive cellulosic materials having a softening agent associated therewith, which softening agent will not interfere with any subsequent treatment of the cellulosic pellicles, such as the application of surface coatings, ink, coloring matter, adhesives, or the like.

It is a still further object of this invention to provide a rigid, flexible, transparent, durable cellulosic pellicle, such as a sheet, film or tube of regenerated cellulose in which the softening agent consists in whole or in part of a water-soluble levulinic acid addition product of ethanolamine.

Other objects of the invention will appear hereinafter.

By the term "rigidity" or its equivalent as used herein is meant that property which is the opposite of limpness; in other words, rigidity in the sense that the pellicle can be advanced in a wrapping machine or similar apparatus without curling, crumpling or otherwise fouling the machine.

The term "durability" is used to define resistance to shock or rough handling. Thus, for example, bags may be fabricated from the pellicle and filled with some standard material such as a certain weight of dried beans, and the package sealed, whereupon the durability may be measured against a known standard by dropping the package under standard conditions and noting the resistance of the wrapper to breakage.

The objects of this invention can be attained, in general, by treating a regenerated cellulose or a like water-sensitive cellulosic pellicle, with a softening agent comprising a levulinic acid addition product of ethanolamine. As specific examples of such compounds may be mentioned the levulinic acid salt of monoethanolamine, the levulinic acid salt of diethanolamine, and the levulinic acid salt of triethanolamine. The excess softening agent is then removed from the pellicle, and the pellicle so treated is dried.

In the manufacture of regenerated cellulose sheets or films, as for example by the viscose process, the cellulosic dispersion is formed into a sheet or film by passing the same through suitable apparatus into coagulating and/or regenerating baths from which it is finally obtained in the form of a continuous cellulosic sheet which is customarily led in a continuous manner through a series of purifying, bleaching and washing operations. Just prior to the drying operation which is also usually continuous, co-ordinating with the sheet forming and purification operations, the film is passed through a bath containing a softening agent in such concentration that after the excess liquid has been removed from the surface of the sheet by suitable squeeze rolls and the excess moisture removed by passage through the dryer, the final sheet can be wound up in a continuous fashion and will contain an appropriate predetermined amount of softening agent.

The commercially available dry regenerated cellulose film contains approximately 4 to 8% moisture. Depending upon the particular uses for which the product is destined, the softening agent in the sheet or film, usually glycerol, may vary from about 8 to 25%, based on the combined weight of the cellulose and softening agent in the sheet.

The total amount of softener in the film is controlled primarily by the total amount of softening agent in the treating bath; film thickness, rate of passage through the bath, temperature of the bath, etc., may also contribute thereto to a certain extent. The regenerated cellulose pellicle, when reaching the treating bath, is in a highly swollen and hydrated condition and usually the cellulose of the pellicle is associated with 300% or more of water. This highly swollen and wet pellicle, usually referred to as the gel sheet, is impregnated with the treating bath. Because of the large amount of water associated with the cellulose, it is apparent that the removal of this water during the drying operation will concentrate the softening agent with respect to the cellulose content of the pellicle.

Thus it is that if a regenerated cellulose pellicle containing about 15% total softener is desired as a final product, the concentration of softener in the treating bath will be adjusted to approximately one-third that value, or about 5%. This is true when the softening agents are, like glycerol and the improved agents of this invention, substantially non-volatile and are not vaporized during the drying operation. It is obvious that if a mixed softener is used, the components of which are appreciably volatile during the drying operation, then the softener concentration of the treating bath must be increased sufficiently to compensate for the loss thereof during the drying step.

It has now been discovered that salts of the type indicated above are extremely well suited as softening agents for water-sensitive cellulosic pellicles, that is, pellicles produced from aqueous alkaline cellulosic solutions or dispersions coagulated in an acid coagulating bath, especially those of regenerated cellulose, and that they may be used as substitutes for glycerol in this capacity. Furthermore, pellicles of regenerated cellulose softened with the materials of this invention possess desirable properties which are not found in similar pellicles in which the sole flexibilizing and softening agent is glycerol.

The following examples will illustrate the practice of the invention, but it is to be understood that they are in no way limitative of the principles of the invention:

Example I

A sheet or film of gel regenerated cellulose in which the final dry thickness will be about .0009", is immersed in or drawn through an aqueous bath containing the levulinic acid salt of monoethanolamine in such concentration that the final dried product will contain about 6.3% moisture and 17% softener, based on the combined weight of cellulose and softener in the film. The sheet or film is allowed to remain in contact with the bath until thoroughly impregnated, whereupon it is removed from the bath, the excess liquid drained off or removed by suitable squeeze rolls, blotters, or the like, when the film can be dried in the usual manner down to the final moisture content indicated above.

When tested at a relative humidity of about 35% at 24° C., or even at relative humidities as low as 15% to 22% at ordinary temperatures, durability of the film is found to be at least equal to that of a similar regenerated cellulose film softened with about 14% glycerol.

Example II

A sheet or continuous film of gel regenerated cellulose such that the final dry thickness will be about .0012" is treated in the manner described in Example I, using, however, a treating bath having a composition capable of providing a final film containing about 6.3% moisture, and 18%–20% of the levulinic acid salt of diethanolamine. In this case the final product will be equal to or better than a similar regenerated cellulose sheet or film bearing 15% to 16% glycerol as softener, insofar as its physical properties are concerned, including transparency, flexibility and durability under varying conditions.

Example III

Mixtures of the materials included by this invention were often found to give excellent results. This is illustrated by the following treating bath which can be used in the manner described in Example I.

| | Per cent by weight |
|---|---|
| Levulinic acid salt of monoethanolamine | 5.0 |
| Levulinic acid salt of triethanolamine | 2.0 |
| Water | 93.0 |

The gel film of gel regenerated cellulose treated with such a bath in accordance with the procedure outlined in Example I will show physical characteristics substantially equal to those of a similar regenerated cellulose sheet treated with a softener bath containing 5% of glycerol (that is, a final film containing about 15% glycerol), especially when the physical properties include transparency, flexibility, rigidity, durability, surface slip and the like.

The following two examples illustrate the use of a mixture of glycerol and a softening agent of this invention.

Example IV

A sheet or continuous film of gel regenerated cellulose similar to that in Example I is treated in the manner described in Example I, using, however, a treating bath of the following approximate composition:

| | Per cent by weight |
|---|---|
| Glycerol | 2.5 |
| Levulinic acid salt of monoethanolamine | 3.0 |
| Water | 94.5 |

*Example V*

Similarly, the following composition may be employed:

| | Per cent by weight |
|---|---|
| Glycerol | 2.5 |
| Levulinic acid salt of diethanolamine | 2.0 |
| Levulinic acid salt of triethanolamine | 1.5 |
| Water | 94.0 |

The films obtained in Examples IV and V will contain total softener in the amounts of about 16.5% and 18%, respectively, based on the combined weight of the cellulose and softener. These films exhibit excellent physical characteristics.

The following example illustrates the method employed when a relatively volatile cellulose softener is admixed with a levulinic acid addition product of ethanolamine when compensation is made for loss during the drying operation:

*Example VI*

A sheet or continuous film of gel regenerated cellulose such that the final dry thickness will be about .0009" is immersed in or passed through a treating bath of the following approximate composition:

| | Per cent by weight |
|---|---|
| Levulinic acid salt of monoethanolamine | 2.75 |
| Ethylene glycol | 2.75 |
| Water | 94.5 |

In this bath the ratio of the levulinic acid salt of monoethanolamine to ethylene glycol is about 1:1. The film is treated as described in Example I and yields a final product containing about 6.3% moisture, 8.25% of the levulinic acid salt of monoethanolamine and 6.6% of ethylene glycol. The ratio of levulinic acid salt of monoethanolamine to ethylene glycol in the dried film is thus about 1.25:1.0, the amount of ethylene glycol having been decreased by loss during the drying operation. The dried film is subsequently provided with a surface coating which may be of any type desired. Thus, for example, it may be provided with a moistureproofing coating which may conveniently contain a cellulose derivative, a plasticizer, a resin or blending agent, and a moistureproofing agent such as a wax or wax-like material. The surface coating in this case serves the double purpose of providing a moistureproof product and of preventing loss by evaporation of the relatively volatile ethylene glycol. Even when tested under such drastic conditions as described in Example I, the product is transparent, flexible, and more durable than a similar film softened with 15% glycerol alone.

Not only do the softeners of this invention produce desirable properties in the base sheet, but when such a sheet is coated with a composition as given above, especially one including a cellulose derivative, said coating is bound to adhere tenaciously to the base sheet even under adverse conditions of moisture, and when subjected to water over long periods of time. The bonding of the coating to the base sheet is observed to be much greater than that between similar coatings and a base sheet softened with glycerol or other softening agents used heretofore in the absence of the materials of this invention.

It is obvious that in the above examples the concentration of total softening agents in the treating bath may be suitably varied according to the base being treated in order that the final product will have the appropriate amount of softener.

As a base, the invention contemplates the use of any water-sensitive cellulosic structure, particularly of pellicular nature such as a sheet or film, artificial straw, caps, bands, or continuous tubes, such as may be obtained by the coagulation and/or regeneration from an aqueous cellulosic dispersion in accordance with the procedure customary to the art. Thus, the invention comprehends the use of regenerated cellulose pellicles such as may be obtained from the viscose or cuprammonium processes, as well as pellicles composed of glycol cellulose, cellulose glycollic acid, lowly esterified or lowly etherified cellulose derivatives where there is only one ether or ester group associated with several cellulose units, and other cellulosic structures of similar character.

Similarly, various types of paper, especially of the glassine type, may be used as base materials. As a matter of convenience, the invention has been described in terms of its application to the softening of regenerated cellulose pellicles such as those sheets or films of regenerated cellulose which are suitable for use as wrapping tissue, it being understood that the scope of the invention includes any of the other bases set forth above and that the invention is equally applicable thereto.

All of the examples given have been set forth in terms of a sheet or film of gel regenerated cellulose (gel regenerated cellulose being defined as a water-swollen regenerated cellulose which has never been dried—hence that product which is obtained from the wet end of the casting machine). Obviously, this is the more practical way of practicing the invention, since the softening agent is customarily incorporated into the sheet or film while the latter is in the gel state and during the normal course of manufacture. Obviously, if one desires to impregnate an already dried regenerated cellulose film with a softener of the character described, it is possible to rewet the dried film so as to render it highly swollen, whereupon it may be treated with treating baths similar to those described, but of composition suitable for obtaining the final product desired. In the same way, any of the sheets set forth as equivalent to regenerated cellulose sheets can be substituted in the specific examples.

The invention has been described in part in terms of the use of glycerol in combination with the softeners of the present invention. It is to be understood that other similar known cellulose softeners may be substituted for the glycerol and among those may be mentioned ethylene glycol, diethylene glycol, triethylene glycol, formamide, carbamide, and other substances known to the art as softeners for water-sensitive cellulose structures.

It is also to be understood that various mixtures of the newly described softening agents may be employed with single softeners of the prior art or with mixtures of the latter, depending upon the type of final film desired and the purposes for which the film is to be used.

If a colored cellulosic pellicle is desired, it may be obtained in any of the ways commonly known to the art, including the passage of the sheet or film through a bath containing a suitable dyestuff. If desired, the dyestuff may be added to the bath used for introducing the softening agent. In the same way, after the film has been treated with the softening agent, it may be subjected to any of the customary after-treatments such as sizing or coating, or the like, which may be customarily given to cellulosic pellicles of the type described, in just the same manner that a glycerol softened regenerated cellulose film, for example, may be treated.

The instant invention offers numerous advantages over the prior art means of softening cellulosic pellicles of the type described. Since the softening agents of the present invention are substantially solid substances at ordinary temperatures, the control of concentrations used for treating baths is greatly simplified. Because of their crystalline nature, the softening agents are available in highly purified condition and consequently improve the quality of the final product. However, unlike many crystalline compounds, they do not crystallize after incorporation in the sheet in the concentrations useful for softening. They can be obtained synthetically at a very low cost in comparison to the cost of known softeners and they are available in unlimited quantity independent of a by-product source.

Since it is obvious that many changes and modifications can be made in the above-described details without departing from the nature and spirit of the invention, it is to be understood that the invention is not to be limited thereto except as set forth in the following claims.

I claim:

1. A flexible, durable, water-sensitive cellulosic structure, said structure containing, as a softener therefor, a water-soluble levulinic acid addition product of ethanolamine.

2. A flexible, durable, regenerated cellulose structure, said structure containing, as a softener therefor, a water-soluble levulinic acid addition product of ethanolamine.

3. A flexible, durable, water-sensitive cellulosic structure, said structure containing, as a softener therefor, the levulinic acid salt of monoethanolamine.

4. A flexible, durable, water-sensitive cellulosic structure, said structure containing, as a softener therefor, the levulinic acid salt of diethanolamine.

5. A flexible, durable, water-sensitive cellulosic structure, said structure containing, as a softener therefor, the levulinic acid salt of triethanolamine.

FREDERICK MADISON MEIGS.